United States Patent [19]
Delery et al.

[11] Patent Number: 5,426,926
[45] Date of Patent: Jun. 27, 1995

[54] LAWNMOWER

[75] Inventors: Marc Delery, Trevoux; Teruhisa Furuta, Soisy sur Montmorency; Alistair Harris, Villeurbanne; Alain Vaugrente, Colombes, all of France

[73] Assignee: Creations Delery & S.A. Kubota Europe, France

[21] Appl. No.: 975,940

[22] PCT Filed: Jul. 17, 1992

[86] PCT No.: PCT/FR92/00695
§ 371 Date: Feb. 23, 1993
§ 102(e) Date: Feb. 23, 1993

[87] PCT Pub. No.: WO93/01706
PCT Pub. Date: Feb. 4, 1993

[30] Foreign Application Priority Data

Jul. 18, 1991 [FR] France .................. 91 09313

[51] Int. Cl.⁶ .............................. A01D 34/74
[52] U.S. Cl. ........................ 56/17.2; 56/320.1
[58] Field of Search .............. 56/12.7, 14.7, 15.1, 56/15.2, 15.5, 17.1, 17.2, 17.5, 320.1, DIG. 20, DIG. 24

[56] References Cited

U.S. PATENT DOCUMENTS 3,759,023 9/1973 Comer .
4,041,679 8/1977 Seifert et al. .
4,320,616 3/1982 Marto .................... 56/17.2 X
4,704,848 11/1987 Nannen ................... 56/17.2
4,835,952 6/1989 McLane .................. 56/17.2
4,905,463 3/1990 Eilles .

FOREIGN PATENT DOCUMENTS 0032968 8/1981 European Pat. Off. .
0047502 3/1982 European Pat. Off. .
0304903 3/1989 European Pat. Off. .
3627208 2/1988 Germany .
2054333 2/1981 United Kingdom .

Primary Examiner—David J. Bagnell
Attorney, Agent, or Firm—Harris Beach & Wilcox

[57] ABSTRACT

There is disclosed a self-propelled lawnmower wherein the wheels are mounted on a fixed frames surrounded, at least on its two lateral faces, by fixed protective skirts which extend practically to ground level. A cutting assembly is mounted on a secondary chassis which can be displaced with respect to the fixed chassis supporting the wheels. A linkage between the two chassis is provided by tilting levers that pivot on the fixed chassis and allow the secondary chassis to be vertically displaced thereon. Movement is transmitted to the drive wheels by a drive gear that engages a ring gear arranged inside each drive wheel, the drive gears being displaceable along the pitch circles of the ring gears when the secondary chassis is displaced.

14 Claims, 5 Drawing Sheets

LAWNMOWER

BACKGROUND OF THE INVENTION

1. Field of the Invention

The present invention relates to an improvement made to lawnmowers, and more particular to so-called "self-propelled" mowers.

2. Description of the Prior Art

Self-propelled lawnmowers consist of assemblies similar to a small trolley which the operator controls and steers in front of him while walking, by means of an assembly which could be termed a steering "crossbar".

Such mowers, of relatively simple design, therefore essentially comprise a support frame for the assembly of active members (cutters, turbines allowing the cut grass to be transferred to a storage enclosure (bag), motor for driving these members), the said chassis being equipped with wheels, two of which are driven wheels, in order to move the vehicle over the ground.

It is well known that, in such assemblies, it must be possible to adjust the cutting height. In order to do this, the most widespread solution consists in mounting the wheels on the chassis by means of assemblies of the "rack" type, thus allowing the cutting blade to be moved away from ground level to a greater or lesser extent. Such a simple and efficient solution, however, exhibits the major drawback of being the cause of frequent accidents, as a consequence of the fact that, when the assembly is in the raised position, the cutting member may throw out stones which may be situated on the surface of the ground, and also because the space becomes sufficient for a person (the operator or a third party) to be able to pass his/her foot under the cutting assembly, such a risk not being eliminated even by fitting peripheral protection cases, given that the said cases are moved simultaneously with the cutting member, and that they are therefore at a variable distance with respect to the ground.

GB-A-2,054,333 describes a solution allowing this safety problem to be solved when the cutting member is moved away with respect to the ground and which consists, in a general manner, in laterally mounting, on the wheel axle, fixed lateral protections. In order to vary the cutting height, assemblies of the "rack" type are used, as recalled previously, allowing individual action on each wheel, and therefore allowing the wheels to be displaced with respect to the cutting assembly. Such a solution, although it solves the safety problem, leads, however, to a complex design. In addition, since the lateral protections are arranged outside the wheels, the size is increased in width, and the cutting areas then become smaller on the sides, which can pose problems in certain areas, for example, when mowing is to be performed along a wall.

In order to solve the problem of adjusting the cutting height, DE-C-3,627,208 proposes using a system of pivoting levers which can be actuated simultaneously, which avoids having to act independently on each of the wheels, as in the conventional solutions recalled previously.

Such a solution, however, complicates the drive of the drive wheels and does not allow the problem of safety to be solved.

Finally, it is appropriate to note that mowers marketed to date are very noisy, and their very design does not allow soundproofing covers easily to be fitted to them.

SUMMARY OF THE INVENTION

Now, and it is this which forms the subject of the present invention, an improvement made to such self-propelled mowers has been found, which allows all of these drawbacks to be solved and which, moreover, significantly simplifies the control of the drive of the drive wheels which such vehicles exhibit.

In a general manner, the invention therefore relates to a novel type of self-propelled lawnmower, essentially consisting of a support chassis mounted on wheels allowing the displacements thereof to be ensured, and on which the set of members allowing the cutting operation to be performed are mounted, and in which:

- the wheels are surrounded, at least on the two lateral faces of the mower, by fixed protective skirts which extend practically as far as ground level;
- means allowing the cutting members to be positioned vertically with respect to the ground, namely between two positions: a low position corresponding to a minimum cutting height, and the other a high position at a maximum cutting height (the distance generally varying between ten millimeters and sixty millimeters);

and it is characterized in that:

- the cutting height is adjusted by vertically displacing, with respect to the fixed chassis supporting the wheels, the assembly of means allowing the cutting operation to be carried out (engine block, cutting head and turbine, transmission to the drive wheels), which is mounted on a chassis or platform which can be moved vertically with respect to the fixed chassis supporting the wheels, the link between these elements being produced by means of tilting levers pivoting on the fixed chassis (about the axis of the wheels), and allowing the chassis or platform to be displaced vertically with respect to the fixed chassis supporting the wheels by following the outline of a circle centered on the axis of the drive wheels;
- movement is transmitted to the drive wheels by means of a drive gear engaged with a ring gear arranged inside each drive wheel and capable of being moved with the chassis or movable platform along the pitch-circle diameter of the ring gear.

By virtue of such an assembly in which all the means necessary for performing the cutting operation are mounted on a chassis or platform which can be moved vertically with respect to the fixed chassis supporting the wheels, it is possible not only practically instantaneously to modify the cutting height, but also to have a very simple transmission to the drive wheels, as well as perfect safety regardless of the cutting height, taking account of the presence of the lateral protection skirts which are not themselves displaced with respect to the ground.

The relative displacements between the fixed chassis and the movable chassis may be controlled by any suitable means; according to a simple embodiment, these two elements will normally be kept apart from one another in the raised position under the action of a spring or jack, lowering being obtained by means of an assembly actuated by the user (a handle for example), compressing the said elements, and means for locking in position naturally being provided.

Moreover, such a type of mower may easily be soundproofed by producing lateral skirts in the form of box structures, and by surrounding the elements placed on the movable chassis by a cover, also in the form of a soundproofing box structure, which fits around the upper part of the fixed lateral skirts.

Finally, according to a preferential embodiment which will be described in more detail in the following part of the description, the longitudinal members of the fixed chassis supporting the wheels themselves constitute the lateral protective and soundproofing skirts.

BRIEF DESCRIPTION OF THE DRAWINGS

The invention and the advantages which it brings will however be better understood by virtue of the embodiment example described hereafter in an indicative but non-limiting fashion, which is illustrated by the appended diagrams in which.

DESCRIPTION OF THE PREFERRED EMBODIMENT

Figure 1:
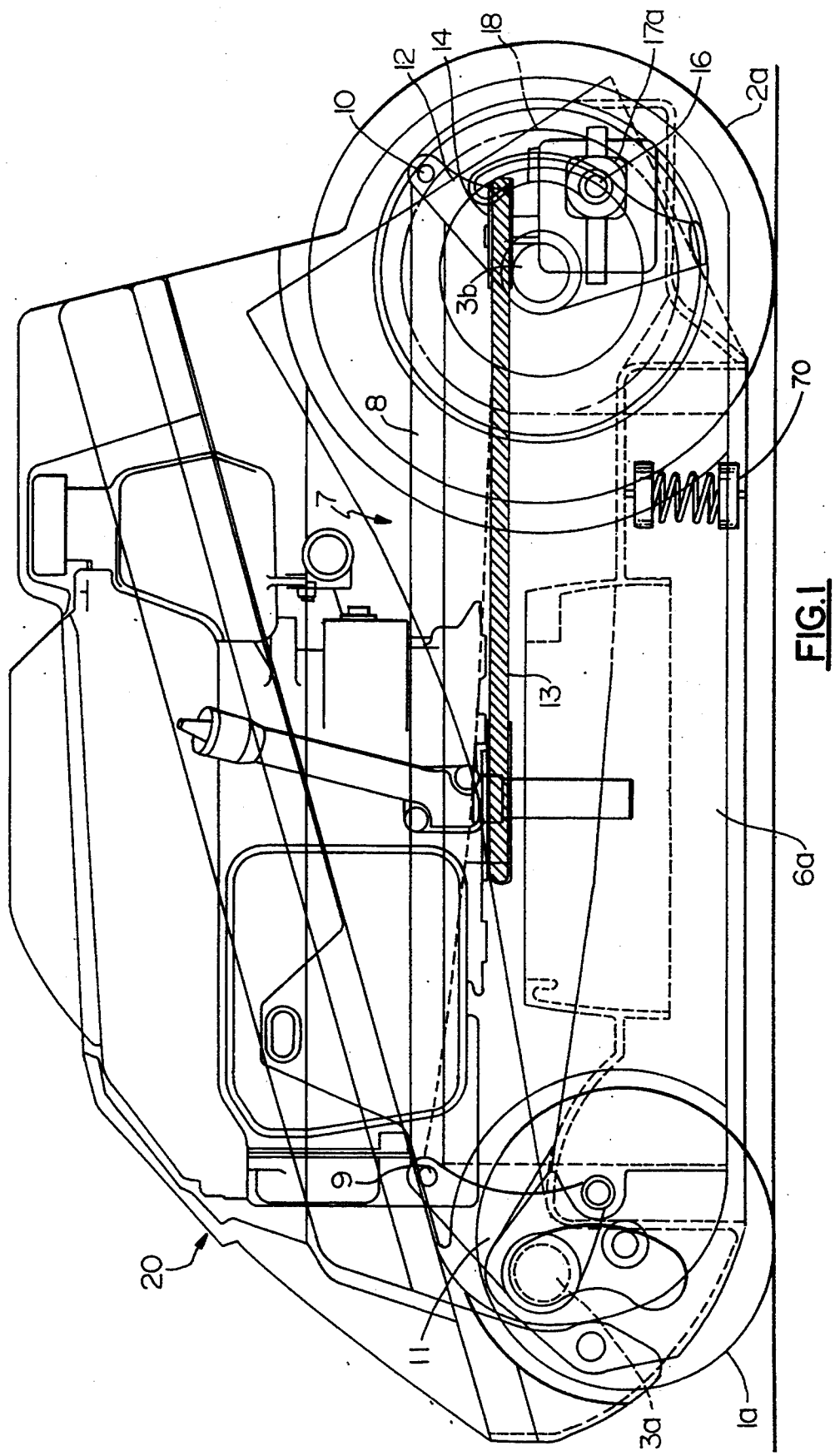
FIGS. 1, 2 and 3 are respectively a side elevation view, a plan view, and a transverse sectional view as seen from the rear, of the assembly of a lawnmower produced in accordance with the invention, the cutting elements being represented in the lowest position.

If reference is made to the appended diagrams, the mower in accordance with the invention consists of a support chassis mounted on wheels (1a, 1b, 2a, 2b) which allow the displacements thereof to be ensured, and on which chassis there are mounted the assembly of members allowing the cutting operation to be performed.

In accordance with the invention, the wheels (1a, 1b, 2a, 2b) are mounted on a fixed frame made up in this case of two cross-members (3a, 3b) respectively connecting the front wheels (1a, 1b) and rear wheels (2a, 2b) to one another, and of elements (6a, 6b) forming longitudinal members. In the example illustrated, the elements (6a, 6b) forming the longitudinal members constitute two fixed protective skirts (6a, 6b) which extend practically to ground level. These protective skirts are preferably produced in the form of molded box structures, filled with a foam (or the like) allowing soundproofing to be ensured. Of course, it could be envisaged to attach the fixed protective skirts (6a, 6b) to a previously formed frame.

Figure 4:
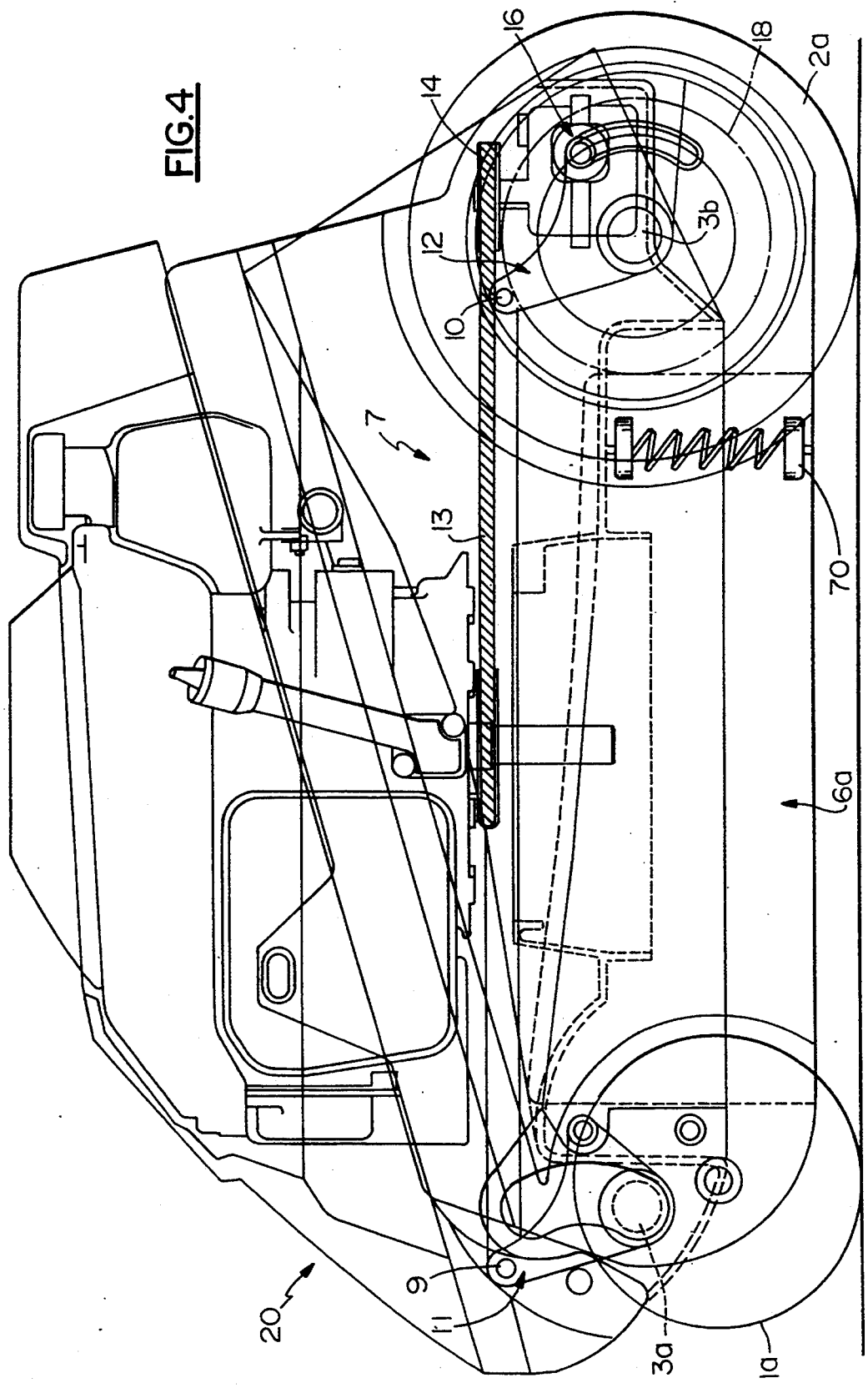
FIGS. 4 and 5 are views similar to FIGS. 1 and 2 of such a mower with the cutting elements represented in the raised position, allowing a maximum cutting height.
Figure 5:
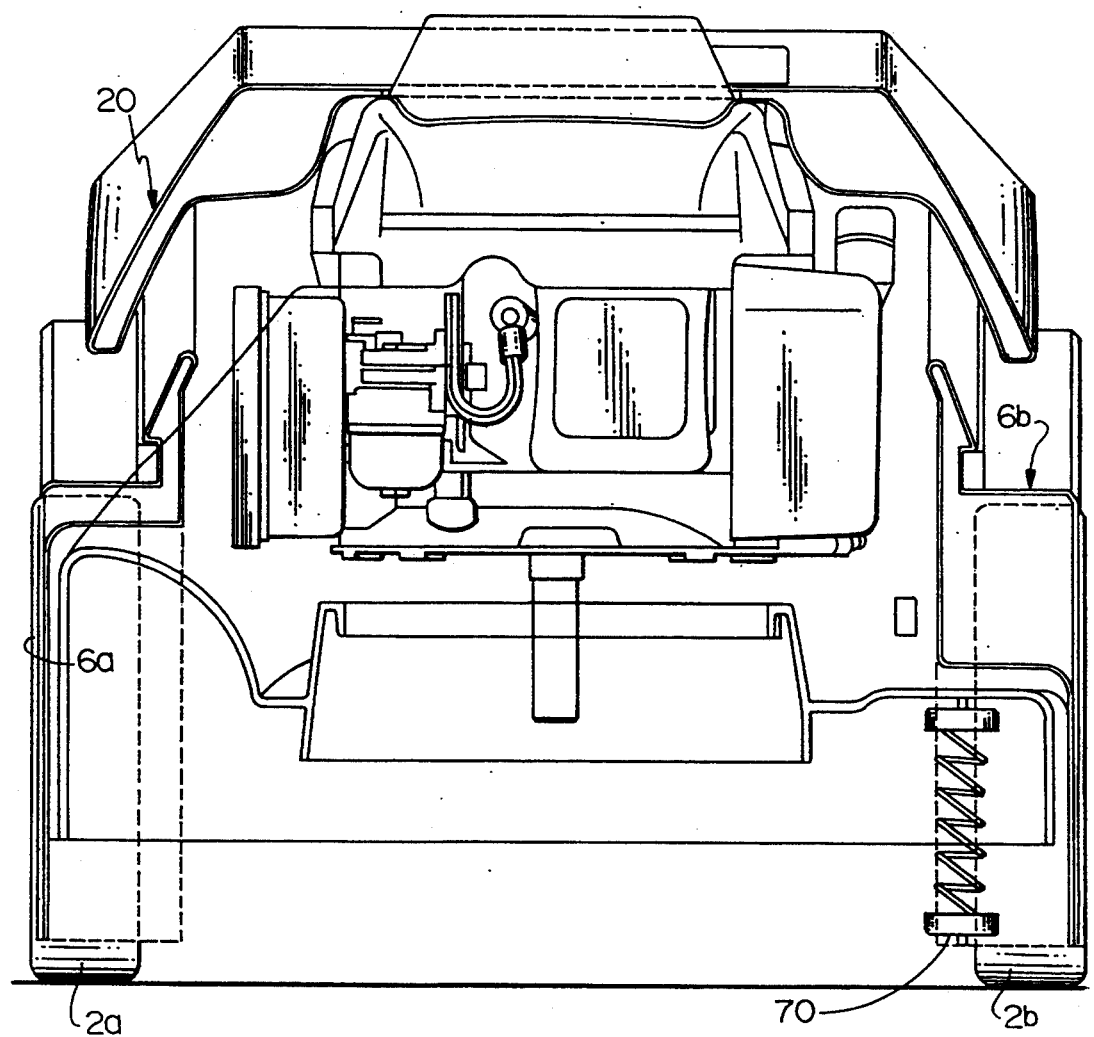

The assembly of the means allowing the cutting operation to be performed, namely the engine block, the cutting head and the turbine (spiral) as well as the power transmission to the drive wheels (2a, 2b), is mounted on a secondary chassis, denoted by the general reference (7), which can be moved vertically with respect to the fixed chassis supporting the wheels (1a, 1b, 2a, 2b). In the embodiment illustrated, the said movable chassis essentially consists of longitudinal members (8), whose ends (9, 10) are connected to the fixed chassis, in the present case to the cross-members (3a, 3b), by means of tilting levers (11, 12) pivoting about the said cross-members (3a, 3b), and whose positioning and dimensions are such that the movable chassis (7) may be displaced vertically following the outline of a circle centered on the axis of the drive wheels (2a, 2b), namely between two positions: a low position (FIGS. 1 and 2) corresponding to the minimum cutting height, and the other a high position (FIGS. 4 and 5) corresponding to a maximum cutting height.

In general, the minimum distance is of the order of ten millimeters, whilst the maximum distance with respect to the ground is of the order of sixty millimeters, passing through any intermediate position desired.

Figure 2:
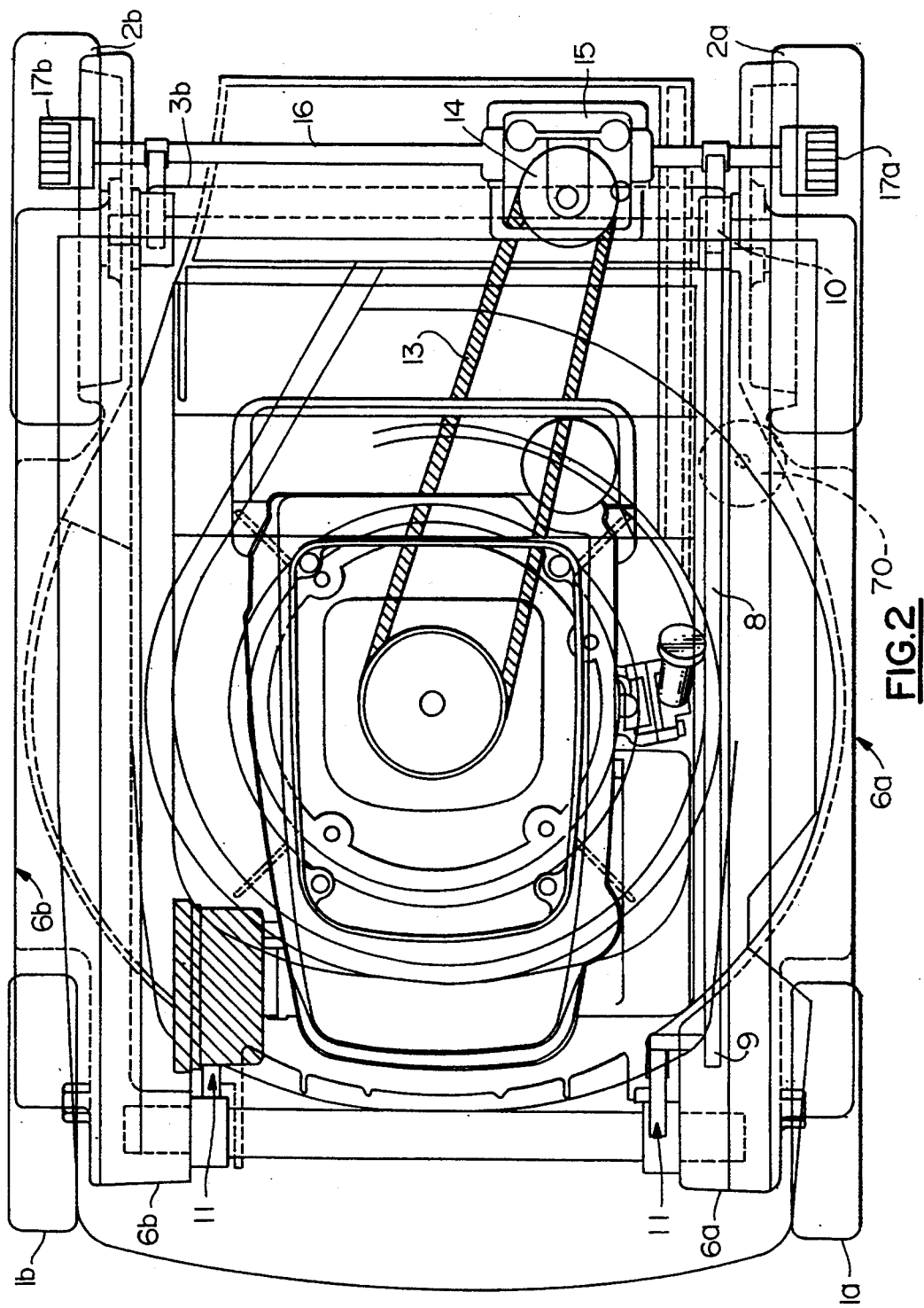
Figure 3:
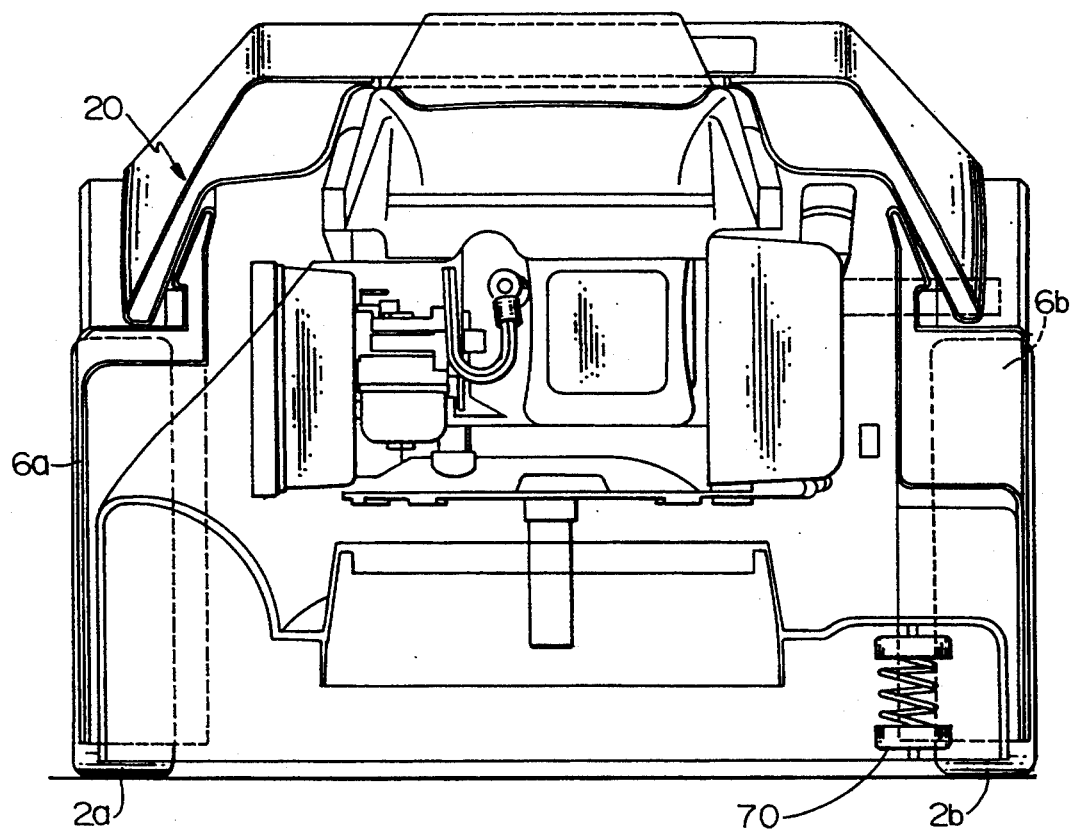

According to the invention, the transmission of movement to the drive wheels (2a, 2b) is obtained by means of a belt (13) driven by the drive shaft, which controls a pulley (14) (see FIG. 2) which, by means of a casing (15), drives a drive Shaft (16) controlling the two wheels (2a, 2b). The wheels (2a, 2b) are driven by means of drive gears (17a, 17b) provided at the end of the shaft (16), the said gears being engaged with a ring gear (18), only the pitch-circle of which has been represented in FIGS. 1 and 4, which ring gear is arranged inside each drive wheel. The said gears (17a, 17b) can therefore be displaced with the movable chassis along the pitch-circle diameter of the said ring gear. It is therefore possible, by virtue of such an assembly, not only practically instantaneously to modify the cutting height between two extreme positions (as illustrated in FIGS. 1 and 2 and in FIGS. 4 and 5 respectively), but also to have a very simple and efficient transmission for the drive wheels, assembly of elements (motor, spiral, transmission on the same path). In addition, perfect safety is obtained given that the lateral skirts and the wheels remain fixed with respect to the ground.

Finally, as emerges from the appended diagrams, such a design makes it possible to have a soundproofed assembly, given that it is possible to attach a cover (20), also in the form Of a box structure, around the elements fixed to the movable chassis, the cover being designed so as, in cooperation with the upper part of the lateral skirts, to ensure good soundproofing as well as protection (especially of the engine and of the exhaust pipe which such an assembly comprises), whilst allowing ventilation.

Finally, the movable chassis may be held in position with respect to the fixed chassis by any suitable means, which may for example consist of a system forming a spring 70, normally holding the movable chassis in a position away from the fixed chassis, lowering being obtained by exerting a pressure, for example by means of a handle, the two elements being immobilized in position with respect to one another by any suitable locking system.

Of course the invention is not limited to the embodiment example described above, but it encompasses all the variants thereof produced in the same spirit.

We claim:

1. A self-propelled lawnmower, having two lateral faces, and comprising:

a support chassis mounted on wheels and supporting thereon a means for cutting, said wheels comprising at least one drive wheel;

at least one fixed protective skirt disposed lateral to said wheels, said skirt covering at least said lateral faces of said lawnmower and extending substantially to ground level;

means for displacing said means for cutting between a low position corresponding to a minimum cutting height and a high position corresponding to a maximum cutting height;

an engine and transmission means connected thereto for imparting motion to said drive wheel, said transmission means comprising a drive gear;

wherein the improvement comprises:

a ring gear disposed within said drive wheel and engaging said drive gear; and a movable chassis, supporting said means for cutting, said engine, and said transmission means, said movable chassis being displaceable with respect to said support chassis and following a profile of said ring gear;

whereby displacement of said movable chassis alters said cutting height and said lawnmower is continually propelled.

2. A lawnmower in accordance with claim 1, wherein said minimum cutting height is ten millimeters, and said maximum cutting height is sixty millimeters.

3. A lawnmower in accordance with claim 1, wherein said profile of said ring gear comprises a circle centered on an axis of said drive wheel.

4. A lawnmower in accordance with claim 1, wherein said means for displacing comprises at least one tilt lever, connected to said support chassis and pivotable about an axis of a said wheel, said lever being connected to said movable chassis for displacement therewith.

5. A lawnmower in accordance with claim 1, further comprising means for biasing said movable chassis and said cutting means into said high position.

6. A lawnmower in accordance with claim 5 wherein said means for biasing is a spring, and further comprising means for opposing said spring.

7. A lawnmower in accordance with claim 1, wherein said skirt comprises sound absorbent material.

8. A lawnmower in accordance with claim 7, further comprising a sound attenuating cover for said movable chassis that connects with said skirt to form a soundproof enclosure.

9. A self-propelled lawnmower, having two lateral faces, and comprising:

a support chassis mounted on wheels and supporting thereon a means for cutting, said wheels comprising at least one drive wheel;

at least one fixed protective skirt disposed lateral to said wheels, said skirt covering at least said lateral faces of said lawnmower and extending substantially to ground level;

means for displacing said means for cutting between a low position corresponding to a minimum cutting height and a high position corresponding to a maximum cutting height;

an engine and transmission means connected thereto for imparting motion to said drive wheels, said transmission means comprising a drive gear;

wherein the improvement comprises:

a ring gear disposed within said drive wheel and engaging said drive gear;

a movable chassis, supporting said means for cutting, said engine, and said transmission means, said movable chassis being displaceable with respect to said support chassis, said drive gear following a circular profile of said ring gear centered on an axis of said drive wheel, said means for displacing comprising at least one tilt lever, pivotally connected to said support chassis, said lever being connected to said movable chassis for displacement therewith;

spring means for biasing said movable chassis and said cutting means into said high position; and means, actuated by an operator, for opposing said spring means for biasing;

whereby displacement of said movable chassis alters said cutting height and said lawnmower is continually propelled.

10. A lawnmower in accordance with claim 9, wherein said minimum cutting height is ten millimeters, and said maximum cutting height is sixty millimeters.

11. A lawnmower in accordance with claim 10, further comprising a sound attenuating cover for said movable chassis that connects with said skirt to form a soundproof enclosure.

12. A lawnmower in accordance with claim 9, wherein said skirt comprises sound absorbent material.

13. A lawn mower comprising:

front and rear wheels, a fixed chassis assembly having a forward section supported by the front wheels and a rear section supported by the rear wheels, said frame assembly further including a right side skirt and a left side, each having a lower end lying close to a ground surface upon which the wheels rest, a handle means extending upwardly from said frame assembly, a movable chassis mounted between the side skirts including an engine mounted in the upper portion thereof and a cutting head mounted in the lower portion thereof, and link means connected at one end to the fixed chassis and the other end to the movable chassis, said movable chassis being vertically movable through said link means, said link means including connecting shaft means for transmitting drive from the engine to said rear wheels.

14. A self-propelled lawnmower having two lateral faces that includes:

a fixed chassis mounted on wheels and supporting thereon a cutting means, said wheels including at least one drive wheel, at least one fixed protective skirt disposed laterally to said wheels, said skirt covering at least said lateral faces of said lawnmower and extending substantially to ground level, means for displacing said cutting means between a low cutting position and a high cutting position, an engine and transmission means connected to said fixed chassis for imparting motion to the drive wheel, said transmission comprising a drive gear wherein the improvement comprises:

a ring gear disposed within and engaging the drive gear, a movable chassis supporting said cutting means, said engine and said transmission, said movable chassis being displaceable with respect to said fixed chassis and following a profile of said ring gear, p1 whereby displacement of said movable chassis alters the cutting height of the cutting means and said lawnmower is propelled.

* * * * *